(No Model.)

J. & F. FIRMENICH.
SUGAR COOLER AND GRANULATOR.

No. 261,819. Patented July 25, 1882.

Witnesses:
Al Stark
Willie O Stark

Inventors:
Joseph Firmenich
Frank Firmenich
by Michael J Stark,
Attorney.

N. PETERS, Photo-Lithographer, Washington, D. C.

UNITED STATES PATENT OFFICE.

JOSEPH FIRMENICH AND FRANK FIRMENICH, OF BUFFALO, NEW YORK.

SUGAR COOLER AND GRANULATOR.

SPECIFICATION forming part of Letters Patent No. 261,819, dated July 25, 1882.

Application filed May 16, 1882. (No model.)

*To all whom it may concern:*

Be it known that we, JOSEPH FIRMENICH and FRANK FIRMENICH, of Buffalo, in the county of Erie and State of New York, have jointly invented certain new and useful Improvements on a Sugar Cooler and Granulator; and we do hereby declare that the following description of our said invention, taken in connection with the accompanying sheet of drawings, forms a full, clear, and exact specification, which will enable others skilled in the art to which it appertains to make and use the same.

This invention has general reference to sugar coolers and granulators; and it consists essentially in the novel and peculiar combination of parts and details of construction, as hereinafter first fully set forth and described, and then pointed out in the claims.

Figure 1:
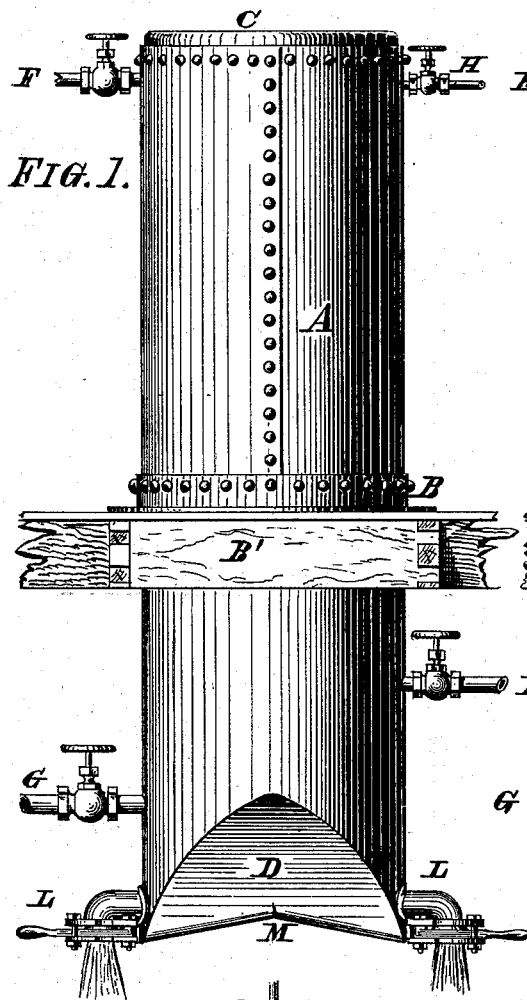
Figure 2:
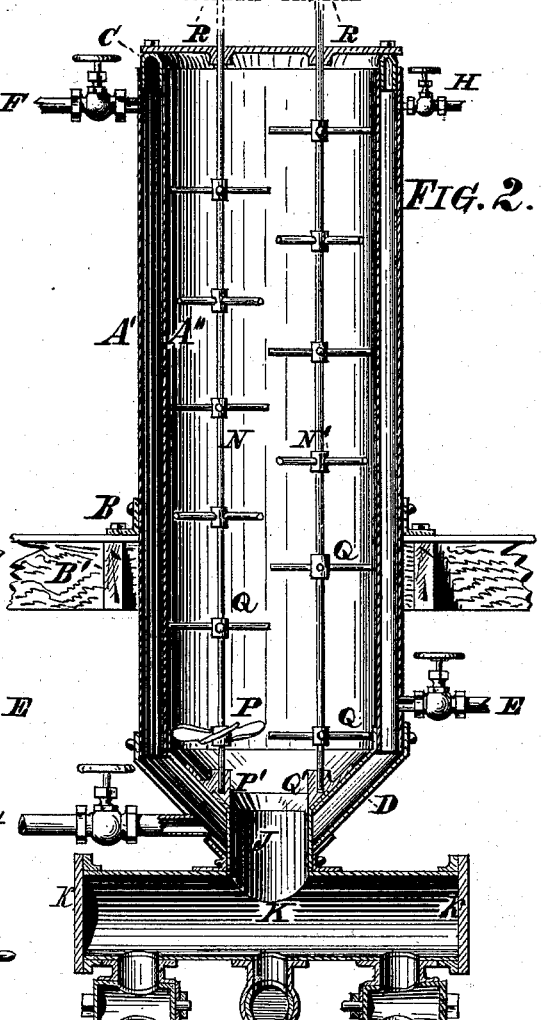
Figure 3:
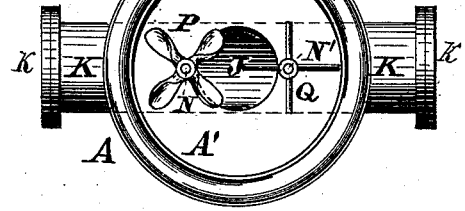

In the drawings already mentioned, which serve to illustrate our said invention more fully, Figure 1 is a side elevation of a sugar cooler and granulator constructed in accordance with our invention. Fig. 2 is a longitudinal sectional elevation. Fig. 3 is plan, and Fig. 4 is a sectional elevation, of the lower portion of the device illustrated in Fig. 1.

Like parts are designated by corresponding letters of reference in all the figures.

A in these drawings designates a cylindrical vessel of proper dimensions, composed of an exterior shell, A', and an interior cylinder, A'', the two shells being united on their upper end by means of a head or collar, C, and on their lower end to a conical part or section, D, the space between the two shells being constructed to receive the frigorific or calorific medium, while the interior of the inner shell is arranged to receive the sugar from the vacuum-pan.

Figure 4:
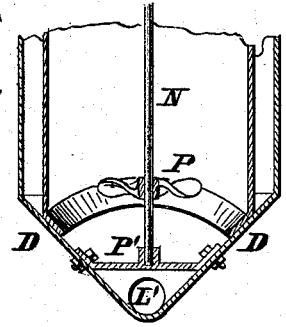

In constructing this vessel A we prefer to flatten the exterior shell, A', at D, as shown in Figs. 1 and 4, and to rivet the inner shell to the outer one on their lower ends in any suitable and convenient manner; but, if desired, they may be constructed, as shown in Figs. 2 and 3, by securing the lower ends of the conical portions of said shells to a tube, J, said tube J being fixed to a horizontal pipe, K, having faucets or other properly-constructed discharge-valves, L, for the escape of the liquid sugar from the interior of the vessel A. As already mentioned, we prefer the construction shown in Figs. 1 and 4, for the reason (among others) that by slightly inclining the lower part of the flattened portion D, as shown at M in Fig. 1, and by placing the gate or other discharge-valves in the corners, the apparatus is considerably cheapened, and better provisions attained for the rapid discharge of the sugar.

In sugar coolers and granulators it is essential that the apparatus be constructed with a special view to its rapid discharge of its contents after the temperature of the liquor has been lowered to the proper point. Otherwise the liquor will stiffen and granulate, and thus be prevented from emptying. For this reason flat-bottomed vessels we have found to be entirely impracticable and useless, and to overcome this trouble we have designed our present cooler, &c., in which we flatten the outer circular shell, so as to produce a gradually-decreasing space, which will offer the least frictional resistance to the discharging-liquor, and at the same time allow of its rapid and entire emptying.

Within the inner shell, A'', we provide two upright shafts, N N', running in opposite directions, with their lower ends in suitably-arranged steps or bearings P' Q', respectively, and on their upper end in proper guides or bearings fastened either to the apparatus or to the ceiling above the same. Upon these shafts N N' are suitably disposed a series of beaters or "sticks," Q, and one or more agitators or propeller-wheels, P, the object of which is to thoroughly agitate the sugar in order to facilitate its rapid reduction in temperature, and thereby to initiate the granulation or crystallization of the sugar.

In operation the apparatus is suspended through the floor below the vacuum-pan by means of a collar or other proper device, B, in such a manner that the liquor as discharged from the said pan can readily enter the cooler and granulator. Now a supply of cold water or any other refrigerating medium is passed in between the shells A A' through the valve E, and discharged therefrom by the valve F on the upper end of the apparatus, the sugar being in the meantime thoroughly agitated by the beaters Q, driven by the pulleys R in any suitable manner. If, for any reason whatever, there should be a tendency to "freeze" the sugar in the cooler, the cold water is rapidly discharged from the apparatus through the blow-off valve G, and steam admitted through the supply-pipe H on the upper (or other portion) end of the machine, the water of condensation being discharged from the blow-off valve G and the sugar-liquor sufficiently elevated in temperature to enable its being discharged from the cooler.

By constructing a cooler and granulator as shown in Figs. 1 and 4 we derive, in addition to the results already mentioned, the further advantage that two trucks may at once be passed under the apparatus and the sugar emptied into two, or even more, pans at one and the same time, thereby greatly facilitating the discharging of the cooler and lessening the chances of having a portion of the charge frozen in the cooler.

Having thus fully described our invention, we claim as new and desire to secure to us by Letters Patent of the United States—

1. The combination, in a sugar cooler and granulator, with the outer shell, A', having on its lower end the flattened portions D and discharge gates or valves in the corners of said flattened portion, of the inner shell, A'', extending to near the lower end of said exterior shell, the supply-pipes E and H, discharge-pipes E and G, and the beater shaft or shafts N, with the agitators Q, the whole being constructed for operation substantially in the manner as and for the object specified.

2. In sugar coolers and granulators, an exterior shell, A', having its lower end flattened and tapered off, so as to gradually contract the interior space in said shell on two opposite sides, as specified, and provided with discharge-valves in the lowest points of said flattened and tapering portion, substantially as and for the purpose stated.

3. In sugar coolers and granulators, two shells, as described, the outer one being flattened or contracted on its lower end and provided with discharge valves or gates in the corners, substantially as specified.

4. In sugar coolers and granulators, two shells, as described, contracted at the lower end, as specified, and provided with discharge-valves at the lowest part, two series of agitators or beaters revolving in opposite directions within the inner shell, supply-pipes for the frigorific and calorific media, and two sets of means for discharging the former medium, as and for the object stated.

5. In sugar coolers and granulators, an exterior shell, A', having its lower end flattened and tapered off, so as to gradually contract the interior space in said shell, substantially as specified, and provided with discharge-valves in the lowest points, in combination with suitable means for heating and cooling (or either) the interior of said shell, substantially in the manner as and for the object specified.

In testimony that we claim the foregoing as our invention we have hereto set our hands in the presence of two subscribing witnesses.

J. FIRMENICH.
FRANK FIRMENICH.

Attest:
MICHAEL J. STARK,
JOHN C. DUERR.